US012749350B2

(12) United States Patent
Gonzalez et al.

(10) Patent No.: US 12,749,350 B2
(45) Date of Patent: Sep. 29, 2026

(54) SENSOR-BASED INTELLIGENT SYSTEM FOR VEHICLE FAULT IDENTIFICATION AND RESOLUTION

(71) Applicant: AirWire Technologies, Reno, NV (US)

(72) Inventors: Gerardo Gonzalez, Allen, TX (US); Debashis Bagchi, Reno, NV (US)

(73) Assignee: AirWire Technologies, Reno, NV (US)

(*) Notice: Subject to any disclaimer, the term of this patent is extended or adjusted under 35 U.S.C. 154(b) by 0 days.

(21) Appl. No.: 16/942,679

(22) Filed: Jul. 29, 2020

(65) Prior Publication Data

US 2021/0082207 A1 Mar. 18, 2021

Related U.S. Application Data

(60) Provisional application No. 62/879,981, filed on Jul. 29, 2019.

(51) Int. Cl.
*G07C 5/00* (2006.01)
*G06Q 10/20* (2023.01)
(Continued)

(52) U.S. Cl.
CPC ............. *G07C 5/006* (2013.01); *G06Q 10/20* (2013.01); *G06Q 20/40* (2013.01); *G06Q 30/012* (2013.01); *G07C 5/008* (2013.01); *G07C 5/0808* (2013.01)

(58) Field of Classification Search
CPC ...... G06Q 10/20; G06Q 20/40; G06Q 30/012; G06Q 30/08; G06Q 10/00; G06Q 40/00; G06F 17/60
(Continued)

(56) References Cited

U.S. PATENT DOCUMENTS

| | | | |
|---|---|---|---|
| 5,289,369 | A | 2/1994 | Hirshberg |
| 5,893,893 | A | 4/1999 | Holt et al. |

(Continued)

FOREIGN PATENT DOCUMENTS

| | | | |
|---|---|---|---|
| CN | 2680523 | | 2/2005 |
| CN | 105556246 | A | 5/2016 |

(Continued)

OTHER PUBLICATIONS

U.S. Appl. No. 16/942,722 Final Office Action mailed Apr. 4, 2022.

(Continued)

*Primary Examiner* — Hani M Kazimi
*Assistant Examiner* — Sanjeev Malhotra
(74) *Attorney, Agent, or Firm* — Polsinelli LLP

(57) ABSTRACT

Methods and apparatus consistent with the present disclosure may collect and organize vehicle data. This data may be associated with one or more accessories operational at the vehicle. Each of the accessories may be a factory installed accessory, be an after market accessory added to the vehicle, or combination thereof. Computing devices may be communicatively coupled to a diagnostic or data collection system of a vehicle. These computing devices may also be communicatively coupled to servers that store operational information at a database or may communicate with websites of accessory manufactures or service providers. Program applications operational on a computing device may be downloaded from a server such that functionality of an automated vehicle assistant may be upgraded. A vehicle assistant may monitor parameters of a vehicle and identify that a vehicle needs to be serviced when current vehicle operating conditions do not correspond to required operational operating conditions.

20 Claims, 7 Drawing Sheets

(51) Int. Cl.
*G06Q 20/40* (2012.01)
*G06Q 30/012* (2023.01)
*G07C 5/08* (2006.01)

(58) Field of Classification Search
USPC ....... 705/4, 14.1, 14.51, 14.55, 18, 21, 26.3, 705/26.42, 26.7, 26.8, 35, 39, 43, 44, 705/317, 400, 412; 701/1, 2, 36, 51; 73/861.18; 707/E17.02
See application file for complete search history.

(56) References Cited

U.S. PATENT DOCUMENTS 6,339,745 B1 1/2002 Novik
6,963,899 B1 * 11/2005 Fernandez ......... G06Q 30/0222 705/14.51
8,234,173 B1 * 7/2012 Kumar ................. G06Q 30/012 705/18
8,234,216 B1 * 7/2012 Reese ................... G07F 19/205 705/43
8,468,214 B1 6/2013 Bourlas et al.
8,694,328 B1 * 4/2014 Gormley ............. B60W 30/182 705/26.7
9,230,379 B2 * 1/2016 Ricci .................. G06Q 30/0633
9,536,197 B1 1/2017 Penilla et al.
9,996,878 B1 6/2018 Fox et al.
10,124,682 B2 11/2018 Tsuchiya
10,134,042 B1 11/2018 Prasad et al.
10,198,877 B1 2/2019 Maltsev et al.
10,470,025 B1 11/2019 Hunt et al.
10,629,191 B1 4/2020 Cheng et al.
10,791,417 B1 9/2020 Nicholson et al.
10,940,790 B1 3/2021 Mazuir et al.
12,090,955 B2 9/2024 Gonzalez et al.
2001/0039509 A1 * 11/2001 Dar ...................... G06Q 20/127 701/1
2002/0111822 A1 8/2002 Shimizu et al.
2003/0028451 A1 * 2/2003 Ananian ............ G06Q 30/0615 705/26.42
2003/0041317 A1 2/2003 Sokolov
2003/0065427 A1 4/2003 Funk et al.
2003/0088348 A1 5/2003 Gustavsson et al.
2004/0139034 A1 * 7/2004 Farmer .................. G06Q 40/08 705/400
2005/0075829 A1 4/2005 Polimadei
2007/0005233 A1 1/2007 Pinkus et al.
2007/0061057 A1 3/2007 Huang et al.
2007/0136088 A1 * 6/2007 Farrel .................. G06Q 30/016 73/861.18
2007/0152043 A1 * 7/2007 Mollett .............. G06Q 30/0601 705/26.1
2007/0233363 A1 10/2007 Rosario et al.
2008/0052180 A1 * 2/2008 Lawhorn ............ G06Q 30/0609 705/26.8
2008/0119965 A1 * 5/2008 McCrary ................... E01C 9/02 701/2
2009/0006194 A1 1/2009 Sridharan et al.
2009/0018770 A1 1/2009 Burgess et al.
2009/0076949 A1 * 3/2009 Olliphant ............... G06Q 40/12 705/39
2009/0192807 A1 * 7/2009 Weisbart .............. G06Q 10/087 705/306
2009/0222338 A1 * 9/2009 Hamilton, II .......... G06Q 30/02 705/14.1
2010/0042340 A1 2/2010 Piszko
2010/0063717 A1 3/2010 Proefke et al.
2010/0082246 A1 4/2010 Crane
2010/0106401 A1 4/2010 Naito et al.
2010/0127847 A1 5/2010 Evans et al.
2010/0138146 A1 6/2010 Vogt et al.
2010/0145609 A1 6/2010 Boss et al.
2010/0198508 A1 8/2010 Tang
2010/0217482 A1 8/2010 Vogel et al.
2010/0228639 A1 * 9/2010 Gindele ................. G06Q 20/20 705/44
2011/0112870 A1 5/2011 Berg et al.
2011/0166869 A1 * 7/2011 Froelich .................. H04L 63/08 705/1.1
2011/0191220 A1 * 8/2011 Kidston ................. G06Q 30/04 705/412
2011/0224900 A1 9/2011 Hiruta et al.
2011/0246330 A1 * 10/2011 Tikku .................... G06F 16/583 707/E17.02
2011/0307100 A1 12/2011 Schmidtke et al.
2012/0084097 A1 * 4/2012 Weisbart ................ G16H 20/10 705/2
2012/0136865 A1 5/2012 Blom et al.
2012/0179347 A1 7/2012 Aldighieri et al.
2012/0271725 A1 * 10/2012 Cheng ..................... H04W 4/21 705/21
2012/0323664 A1 12/2012 Klems
2013/0144471 A1 6/2013 Min et al.
2013/0179057 A1 7/2013 Fischer et al.
2013/0261953 A1 10/2013 Kiyama et al.
2013/0274972 A1 10/2013 Kusumi et al.
2013/0289837 A1 * 10/2013 Beams ............ B60W 30/18027 701/51
2013/0308470 A1 11/2013 Bevan et al.
2014/0032101 A1 1/2014 Pandya et al.
2014/0136187 A1 5/2014 Wolverton et al.
2014/0188388 A1 7/2014 Malahy et al.
2014/0199980 A1 7/2014 Rao et al.
2014/0200038 A1 7/2014 Rao et al.
2014/0207959 A1 7/2014 Kamali et al.
2014/0210604 A1 7/2014 Kawashima et al.
2014/0278056 A1 9/2014 Williams et al.
2014/0309868 A1 * 10/2014 Ricci ...................... G06Q 10/00 701/36
2014/0359499 A1 12/2014 Cho et al.
2014/0372221 A1 12/2014 Momin et al.
2015/0112730 A1 * 4/2015 Binion ................... G07C 5/008 705/4
2015/0112731 A1 * 4/2015 Binion ................... G06Q 40/08 705/4
2015/0112800 A1 * 4/2015 Binion .............. G06Q 30/0255 705/14.53
2015/0131857 A1 5/2015 Han et al.
2015/0158393 A1 6/2015 Kawano et al.
2015/0195678 A1 7/2015 Fay et al.
2015/0210292 A1 7/2015 George-Svahn et al.
2015/0213420 A1 * 7/2015 Krishnamurthy ...... G06Q 20/10 705/39
2015/0213518 A1 * 7/2015 Krishnamurthy .. G06Q 30/0283 705/39
2015/0213519 A1 * 7/2015 Krishnamurthy .. G06Q 30/0283 705/35
2015/0278933 A1 * 10/2015 Barfield, Jr. ........... G06Q 30/08 705/26.3
2015/0310451 A1 * 10/2015 Plagens ................ G06Q 30/018 705/317
2015/0363986 A1 12/2015 Hoyos et al.
2016/0311410 A1 10/2016 Donzis et al.
2016/0349075 A1 12/2016 Son
2017/0061965 A1 3/2017 Penilla et al.
2017/0067747 A1 * 3/2017 Ricci ...................... B60K 35/85
2017/0076415 A1 3/2017 Ng-Thow-Hing et al.
2017/0103327 A1 4/2017 Penilla et al.
2017/0256106 A1 9/2017 Hino
2018/0031381 A1 2/2018 Delaruelle
2018/0143029 A1 5/2018 Nikulin et al.
2018/0165610 A1 6/2018 Dumant et al.
2018/0286245 A1 10/2018 Obaidi
2018/0300337 A1 10/2018 Thomas et al.
2018/0350167 A1 12/2018 Ekkizogloy et al.
2019/0084420 A1 3/2019 Kim et al.
2019/0178661 A1 6/2019 Sakaida et al.
2019/0184774 A1 6/2019 Okada
2019/0189132 A1 6/2019 Viswanathan
2019/0193681 A1 6/2019 Ito et al.
2019/0316922 A1 10/2019 Peterson et al.
2019/0318035 A1 10/2019 Blanco et al.

(56) References Cited

U.S. PATENT DOCUMENTS

| | | | | |
|---|---|---|---|---|
| 2020/0027283 | A1 | 1/2020 | Nishikawa | |
| 2020/0055518 | A1 | 2/2020 | Johnson | |
| 2020/0064831 | A1 | 2/2020 | Pedersen et al. | |
| 2020/0092689 | A1 | 3/2020 | Zhang et al. | |
| 2020/0133271 | A1 | 4/2020 | Grundey et al. | |
| 2020/0193549 | A1 | 6/2020 | Pedersen et al. | |
| 2020/0211553 | A1 | 7/2020 | Bohl et al. | |
| 2020/0238952 | A1 | 7/2020 | Lindsay et al. | |
| 2020/0247195 | A1 | 8/2020 | Kona et al. | |
| 2020/0250696 | A1 | 8/2020 | Cordell | |
| 2020/0250898 | A1 | 8/2020 | Rafferty et al. | |
| 2020/0356339 | A1 | 11/2020 | Krishnan et al. | |
| 2021/0078539 | A1 | 3/2021 | Gonzalez | |
| 2021/0081863 | A1* | 3/2021 | Gonzalez | G07C 5/008 |
| 2021/0114618 | A1 | 4/2021 | Suzuki et al. | |
| 2021/0160306 | A1 | 5/2021 | Waterton et al. | |
| 2021/0173377 | A1 | 6/2021 | Laftchiev et al. | |
| 2021/0217409 | A1 | 7/2021 | Choi et al. | |
| 2021/0404833 | A1 | 12/2021 | Padeimaite et al. | |
| 2025/0010816 | A1 | 1/2025 | Gonzalez et al. | |
| 2025/0156779 | A1 | 5/2025 | Gonzalez et al. | |
| 2026/0010168 | A1 | 1/2026 | Mursia et al. | |

FOREIGN PATENT DOCUMENTS

| | | |
|---|---|---|
| CN | 107590763 | 1/2018 |
| DE | 102013201746 A1 | 8/2013 |
| WO | WO 2020/091806 | 5/2020 |
| WO | WO 2020/226650 | 11/2020 |

OTHER PUBLICATIONS

U.S. Appl. 16/940,173 Final Office Action mailed Nov. 9, 2021.

AirWire Connected CAR IoT Device, AirWire Technologies, Sep. 2016.

AirWire Technologies and Reliance Jio Partner to Bring Connected Car Apps and Services to India, Business Wire, Feb. 26, 2017. https://www.businesswire.com/news/home/20170226005089/en/AirWire-Technologies-and-Reliance-Jio-Partner-to-Bring-Connected-Car-Apps-and-Services-to-India (Year: 2017).

U.S. Appl. No. 16/940,173 Office Action mailed Jun. 28, 2021.

U.S. Appl. No. 16/942,722 Office Action mailed Aug. 18, 2021.

U.S. Appl. No. 16/940,173 Final Office Action mailed Jul. 6, 2023.

U.S. Appl. No. 16/940,173 Office Action mailed Aug. 11, 2022.

U.S. Appl. No. 16/942,722 Office Action mailed Apr. 11, 2023.

Macro, computer science, wikipedia, archives org Feb. 11, 2020 http://web.archive.org/web/20200211082902/https://en.wikipedia.org/wiki/Macro_(computer_science) (Year: 2020).

U.S. Appl. No. 16/940,173 Office Action mailed Apr. 16, 2024.

U.S. Appl. No. 16/940,173, Final Office Action dated Sep. 16, 2024.

U.S. Appl. No. 19/026,051, Office Action dated Jun. 10, 2026.

U.S. Appl. No. 18/884,718, Office Action dated Mar. 4, 2026.

* cited by examiner

SENSOR-BASED INTELLIGENT SYSTEM FOR VEHICLE FAULT IDENTIFICATION AND RESOLUTION

CROSS-REFERENCE TO RELATED APPLICATIONS

This application claims priority benefit to U.S. provisional patent application 62/879,981, filed Jul. 29, 2019 the disclosure of which is hereby incorporated by reference.

BACKGROUND OF THE INVENTION

Field of the Disclosure

The present disclosure is generally related to a system and method for collecting data regarding the operation of a vehicle. More specifically the present disclosure is directed to evaluating and resolving conditions associated with the vehicle.

Description of the Related Art

Vehicles when they are produced today include computing devices that collect data regarding the performance of various systems within a vehicle. Modern vehicles also include an on board diagnostic computer bus (OBD) that service technicians may couple devices to such that fault codes and certain operational characteristics of a vehicle may be monitored. These monitoring systems within particular vehicles are not designed to be expanded after a vehicle is manufactured. New aftermarket sensors capable of monitoring the operation of a vehicle cannot by easily added to the vehicle. For example, if a vehicle is manufactured with an oil sensor, yet without tire pressure sensors, a control system of that vehicle could monitor oil pressure, yet could not monitor tire pressure. Drivers and owners of vehicles, therefore, could benefit by being able to add sensors to their vehicle that are coupled to a diagnostic computer bus to help monitor the performance of older vehicles. Furthermore, even older vehicles may not have a computer diagnostic bus or computer that monitors vehicle operational parameters at all. Some vehicles may have been manufactured with an on board diagnostic version 2 (OBD-II) bus, other vehicles may have been manufactured with an OBDI version 1 (OBD-I) bus, and yet other vehicles may not have been manufactured with a computer diagnostic bus at all. Vehicles that include an OBD bus also include connection ports that allow service technicians monitor the operation of a vehicle or when those technicians evaluate fault codes communicated over the OBD bus. To accomplish this, a service technician must connect a piece of test equipment to the OBD bus when the vehicle is operational.

Another issue with modern vehicles is that drivers or owners of those vehicles do not have access to diagnostic information communicated over a diagnostic computer bus of their vehicle. The only way that drivers or vehicle owners can access information on a vehicle diagnostic computer bus is to bring their vehicle into a service center and have a technician monitor the operation of their vehicle. Drivers and owners of vehicles, however could benefit from an ability to monitor data transmitted over a vehicles diagnostic computer bus when that vehicle is not at a service center. Furthermore, issues that affect the performance of a vehicle can sometimes be intermittent or only occur under specific or even mysterious conditions. Because of this, even when a vehicle owner brings their vehicle to a service center, a technician at the service center may not be able to identify or verify a problem reported by the vehicle owner.

Yet another issue regarding maintaining a vehicle is that when an operating condition arises with that vehicle, a driver may not be aware of service centers capable of resolving the issue according to the terms of a warranty or according to a preferred payment criteria.

What are needed are systems that allow vehicle drivers or owners to monitor operating characteristics of their vehicle continuously. What are also needed are systems that enable older vehicles without advanced communications equipment to be easily retrofitted with systems that will communicate vehicle operating data to an intelligent platform that will interpret collected data and provide appropriate recommendations to vehicle drivers and owners. Furthermore, vehicle owners and drivers would benefit from intelligent platforms that are aware of vehicle warranty requirements, user payment preferences, and other user preferences such that vehicles can be more easily maintained.

SUMMARY OF THE PRESENTLY CLAIMED INVENTION

The presently claimed invention is directed to a method, a non-transitory computer-readable storage medium, and an apparatus that may monitor operations at a vehicle and that may provide recommendations to users of the vehicle. In one embodiment the presently claimed method may include identifying a first accessory at a vehicle that senses vehicle operational data and identifying a normal operational range of that operational data. The presently claimed method may also include the steps of receiving the sensed vehicle operational data from the first accessory, identifying that the sensed vehicle operational data is out of the normal operating range, and sending a recommendation that identifies a corrective action that would result in the vehicle operating within the normal operating range.

In a second embodiment, the presently claimed may be implemented as a non-transitory computer readable storage medium, where a processor executes instructions out of the memory to implement the presently claimed method. Here again the method may include the steps of identifying a first accessory at a vehicle that senses vehicle operational data and identifying a normal operational range of that operational data. The processor may also execute instructions out of the memory to receive the sensed vehicle operational data from the first accessory, identify that the sensed vehicle operational data of the first accessory is out of the normal operating range, and send a recommendation that identifies a corrective action that would result in the vehicle operating within the normal operating range.

A third embodiment of the presently claimed invention may be an apparatus that includes an interface that receives diagnostic data transmitted via a communication bus at a vehicle, a first accessory that senses vehicle operational data, a memory, and a processor that executes instructions out of the memory. This processor may execute instructions out of the memory to identify the first accessory at a vehicle that senses the vehicle operational data and identify a normal operational range of the sensed vehicle operational data of the first accessory. The sensed vehicle operational data may be received from the first accessory after which the processor may then identify that the sensed vehicle operational data of the first accessory is out of the normal operating range. The presently claimed apparatus may also include a communication interface that provides a recommendation that identifies a corrective action that would result in the sensed vehicle operational data of the first accessory being within the normal operating range.

BRIEF DESCRIPTIONS OF THE DRAWINGS

DETAILED DESCRIPTION

Methods and apparatus consistent with the present disclosure may collect and organize vehicle data. This data may be associated with one or more accessories operational at the vehicle. Each of the accessories may be a factory installed accessory, be an after market accessory added to the vehicle, or combination thereof. Computing devices may be communicatively coupled to a diagnostic or data collection system of a vehicle. These computing devices may also be communicatively coupled to servers that store operational information at a database or may communicate with websites of accessory manufactures or service providers. Program applications operational on a computing device may be downloaded from a server such that functionality of an automated vehicle assistant may be upgraded or expanded. A vehicle assistant may monitor parameters of a vehicle and identify that a vehicle needs to be serviced when current vehicle operating conditions do not correspond to required or desired operational operating conditions.

Figure 1:
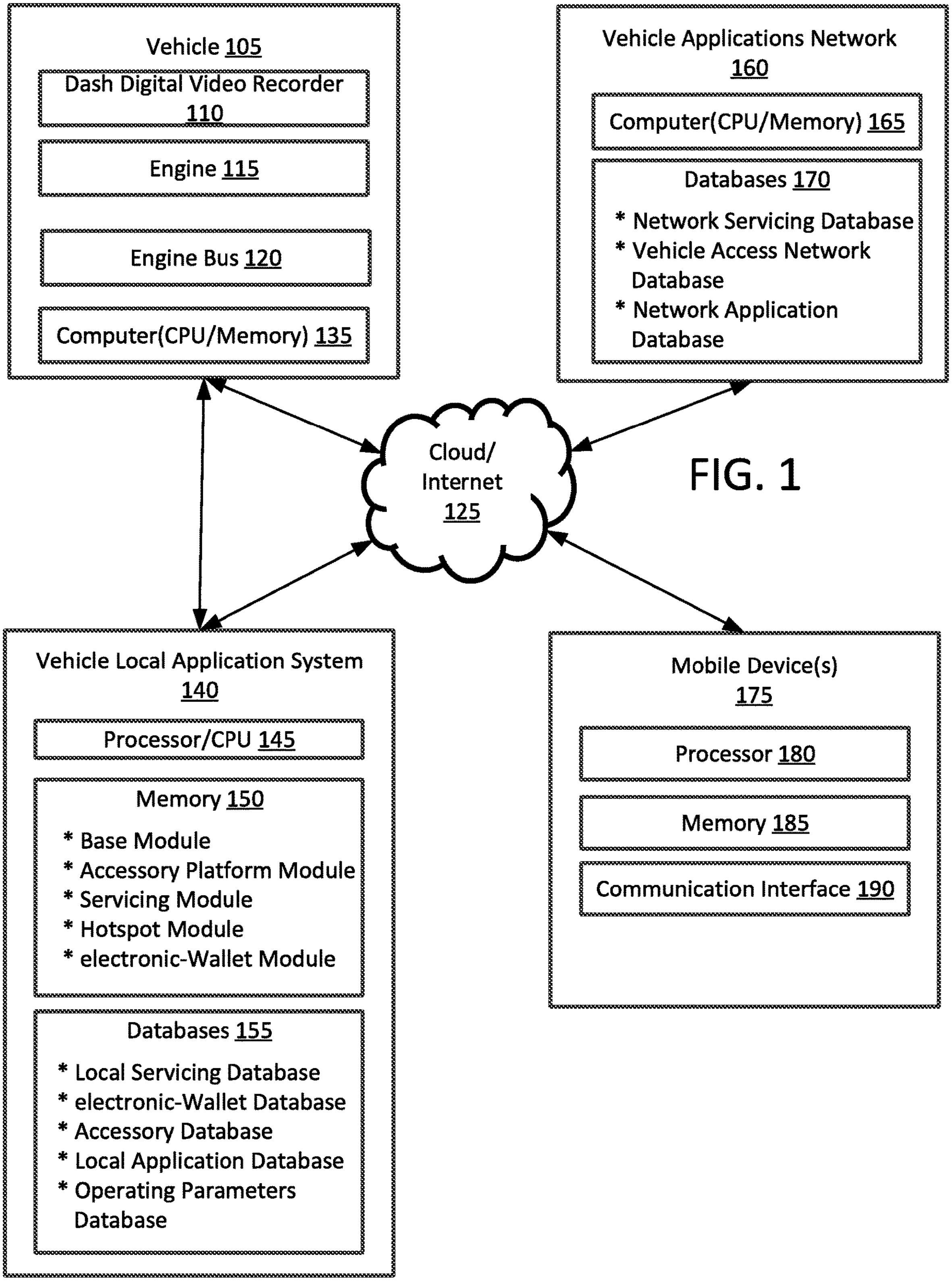
FIG. 1 illustrates an intelligent vehicle monitoring, reporting, recommendation, and payment system.

FIG. 1 illustrates an intelligent vehicle monitoring, reporting, recommendation, and payment system. The system of FIG. 1 monitors the performance of a vehicle and may automatically provide recommendations to vehicle owners and drivers regarding issues associated with the operation of their vehicle. The system comprises of a vehicle 105, such as a car, motorcycle, truck, van or RV, that has on an on board diagnostic version 2 (OBD-II) port but lacks factory-installed communications equipment. The vehicle 105 includes a dash digital video recorder (DVR) 110 or dashcam. DVR 110 may be referred to as a dashboard camera, car DVR, driving recorder, or event data recorder (EDR) that may continuously record the view through a vehicle's front windscreen and sometimes rear or other windows. Some dashcams include a camera to record the interior of the car by capturing images that span 360 degrees. Such an inside camera may be constructed in the form of a ball. Dashcams may also be able to automatically send pictures and video to other computing devices that may be external to a vehicle. Apparatus consistent with the present disclosure may received data from dashcams even when those apparatus are located at a vehicle that includes the dashcam.

The vehicle 105 of FIG. 1 also includes an engine 115 that powers the vehicle 105, engine bus 120, and computer 135. Engine 115 may be an internal combustion engine, an electric motor, or may be an engine in a hybrid-electric motor-generator-battery configuration. Engine bus 120 is a specialized internal communications network that interconnects components inside vehicle 105 (e.g., automobile, bus, train, industrial or agricultural vehicle, ship, or aircraft). Special requirements for vehicle control such as assurance of message delivery of non-conflicting messages, of minimum time of delivery, of low cost, and of electromagnetic frequency (EMF) noise resilience. Such requirements may also include redundant routing or other characteristics that may have been mandated or include the use of common or uncommon networking protocols. Such networking protocols may include, yet are not limited to a controller area network (CAN), a local interconnect network (LIN). All vehicles sold in the United States since 1996 have required an on-board diagnostic (OBD) port that complies with the OBD-II standard, OBD-II is an improvement over OBD-I in both capability and standardization. The OBD-II standard specifies a type of diagnostic connector and its pinout, the electrical signaling protocols available, and the messaging format. It also provides a candidate list of vehicle parameters to monitor along with how to encode the data for each. These diagnostic computer connectors include a pin in the connector that provides power that may be used to power a scan tool from the vehicle battery. This eliminates the need to connect a scan tool to a power source separately. However, some technicians might still connect a scan tool to an auxiliary power source to protect data collected by the scan tool in the unusual event that a vehicle experiences a loss of electrical power due to a malfunction. Finally, the OBD-II standard provides a list of standardized diagnostic trouble codes (DTCs). As a result of this standardization, a single device can query the on-board computer(s) for parameters in any vehicle and the DTC codes may be used to identify components within a vehicle that are failing or these codes may indicate that the vehicle components are operating within normal operating parameters. The OBD-II standard was prompted to simplify diagnosis of increasingly complicated emissions equipment, and though only emission-related codes and data are required to be transmitted through it according to U.S. legislation, most manufacturers have made the OBD-II data link connector the main connector in the vehicle through which all systems are diagnosed and reprogrammed.

Computer 135 of vehicle 105 is illustrated as including a central processing unit (CPU) and a memory. While illustrated separately from DVR 110, DVI 110 may include or incorporate the functions of computer 135.

Vehicle local applications (VLA) system 140 may include computer memory 150 on which one or more software modules, program applications, and database data may be stored. This memory 150 can be built into the vehicle 105 itself, be part of a device that is plugged into the OBD-II port on the vehicle 105 or may be a wireless device, such as a smartphone, that communicates with a device plugged into the OBD-II port on the vehicle. A VLA base software module may be initiated or operated whenever power is supplied to the vehicle 105 each of a set of sub-modules may include instructions executable by processor/CPU 145 to provide functionality to a user based on monitoring data transmitted via engine bus 120. Memory 150 of the vehicle location application system 140 of FIG. 1 is illustrated as storing software modules that may include a base module, an accessory platform module, a servicing module, a hotspot module, and an electric-wallet (e-wallet) module. The accessory platform software module of FIG. 1 may store instructions that allow processor/CPU 145 to evaluate data collected by sensors. Such sensors may include aftermarket sensors, such as engine sensors, boost sensors, tire pressure sensors, etc., into the functionality of the system. The service software module stored in memory 150 may include instructions that allow processor 145 to continuously monitor operating conditions of the vehicle 105 so as to identify any data point that is outside of a set of standard conditions. This may allow processor 145 to identify whether vehicle 105 requires service, identify a qualified service facility, and may allow a service appointment to be booked automatically. The hotspot software module of FIG. 1 may include instructions that allow processor 145 to filter or initiate application programs (APPS) that may be available to perform additional functions.

Processor 145 may execute instructions of memory 150 when accessing any of the databases 155 of the VLA system 140 or when communicating with the vehicle applications network 160. VLA system 140 may communicate with the vehicle applications network 160 via the cloud or Internet 125. In certain instances, processor 145 may communicate with vehicle computer 135 using a direct communication link or a wireless communication interface at vehicle 105. In other instances, processor 145 may be part of computer 135 of vehicle 105.

The databases 155 of vehicle local application system 140 include a local servicing database, an e-wallet database, an accessory database, a local application database, and an operating parameters database. Each of the respective databases 155 may be referred to as a specific type of VLA database.

The local servicing database of databases 155 may store information about service stations, their capabilities, rates, hours, etc., for use by the VLA servicing software module stored in memory 150 of VLA system 140. A VLA e-wallet database may store account information utilized by the VLA e-wallet software module in memory 150 for making payments. Instructions of the VLA e-Wallet Module when executed by processor 145 may allow processor 145 to provide or authorize a payment to authorized payees (payment receivers).

The VLA accessories database of databases 155 may store information about accessories connected to vehicle 105, such as heads up displays, tire pressure sensors, engine sensors, etc. The execution of instructions of the accessory platform software module 114 stored in memory 150 may allow processor 145 to access accessory data (e.g. heads up display data or sensor data). The VLA local applications database may store program applications that were selected by the user to download from the network applications database 170 of vehicle applications network 160 for use in the vehicle 105.

The operating parameters database of databases 155 may store information related to operating characteristics of the vehicle 105. This data may include safe operating ranges for any measured vehicle parameter, such as coolant temp, oil pressure, etc. the operating parameters database may also store information relating to services that may be provided when measured values fall outside of a given operating range. For example, in an instance when the coolant temperature is above a certain threshold, a cooling system failure may be identified. The data stored within the operating parameters database may have been provided by the vehicle manufacturer.

Various devices illustrated in FIG. 1 may communicate via a cloud or Internet network connection 125. This may allow the vehicle location application system 140, a vehicle applications network 160 computer, and user mobile device(s) 175 to communicate with each other. FIG. 1 includes vehicle applications network 160 that includes computer (CPU/memory) 165 and databases 170. Databases 170 may include a network servicing database, a vehicle access network (VAN) database, and a network application database. Computing devices may be able to access the vehicle applications network 160 when identifying service stations, identifying or registering users of the VLA system, or when identifying or downloading application programs. Processor 145 at VLA system 140 may access the vehicle applications network 160 when identifying or filtering program applications that may be available for download from the network application database. VLA system 140 may access the network applications database based on the current operating characteristics of the vehicle. For example, an application program that identifies local attractions for a vehicle that is stationary may be accessed to identify those local attractions. Furthermore, action games program applications may be accessed when the vehicle is on a winding road or program applications that provide entertainment when the vehicle is cruising on the highway may be provided to VLA system 140.

The computer 165 at vehicle applications network 160 may include a processor/CPU and a memory of a server or series of servers, that may be communicatively coupled to the vehicle 105 or the vehicle location application system 140 via the cloud or Internet 125. Data stored in memory 150 or in databases 155 of the vehicle location application system may be updated with information from databases 170 of the vehicle applications network 160. As such available applications, service station information, and an inventory of all applications operational at the vehicle location application system 140 may be updated periodically updated when desired.

The network servicing database of databases 170 of the vehicle applications network 160 may store an inventory of service stations available to service vehicle 105. The network servicing database at the vehicle application network 160 may store information that identifies a larger set of service providers as compared to the local servicing database of the vehicle location application system 140. Service stations stored in a local servicing database may have been filtered to only include local service stations or to store only service stations that are authorized to service vehicle 105. The vehicle access network (VAN) Database of databases 170 may store information that identifies all users of a VLA system. As mentioned above the network application database may store all program applications that are available for download to the VLA system 140 of FIG. 1.

The mobile device(s) 175 illustrated in FIG. 1 includes processor 180, memory 185, and communication interface 190. These mobile device(s) 175 may be any type of mobile computing device known in the art, such as a smartphone, tablet computer, or notebook computer. Mobile devices 175 may be configured to operate as a VLA system device, as such mobile devices 175 may perform all of the operations of VLA system 140. In one embodiment, VLA system 140 may be configured to plug into a diagnostic port of vehicle computer 135 (via engine bus 120) and VLA system 140 may then communicate with mobile devices when methods consistent with the present disclosure are performed. In such an instance, a mobile device may communicate with VLA system 140 using short distance wireless communications, such as Bluetooth.

Figure 2:
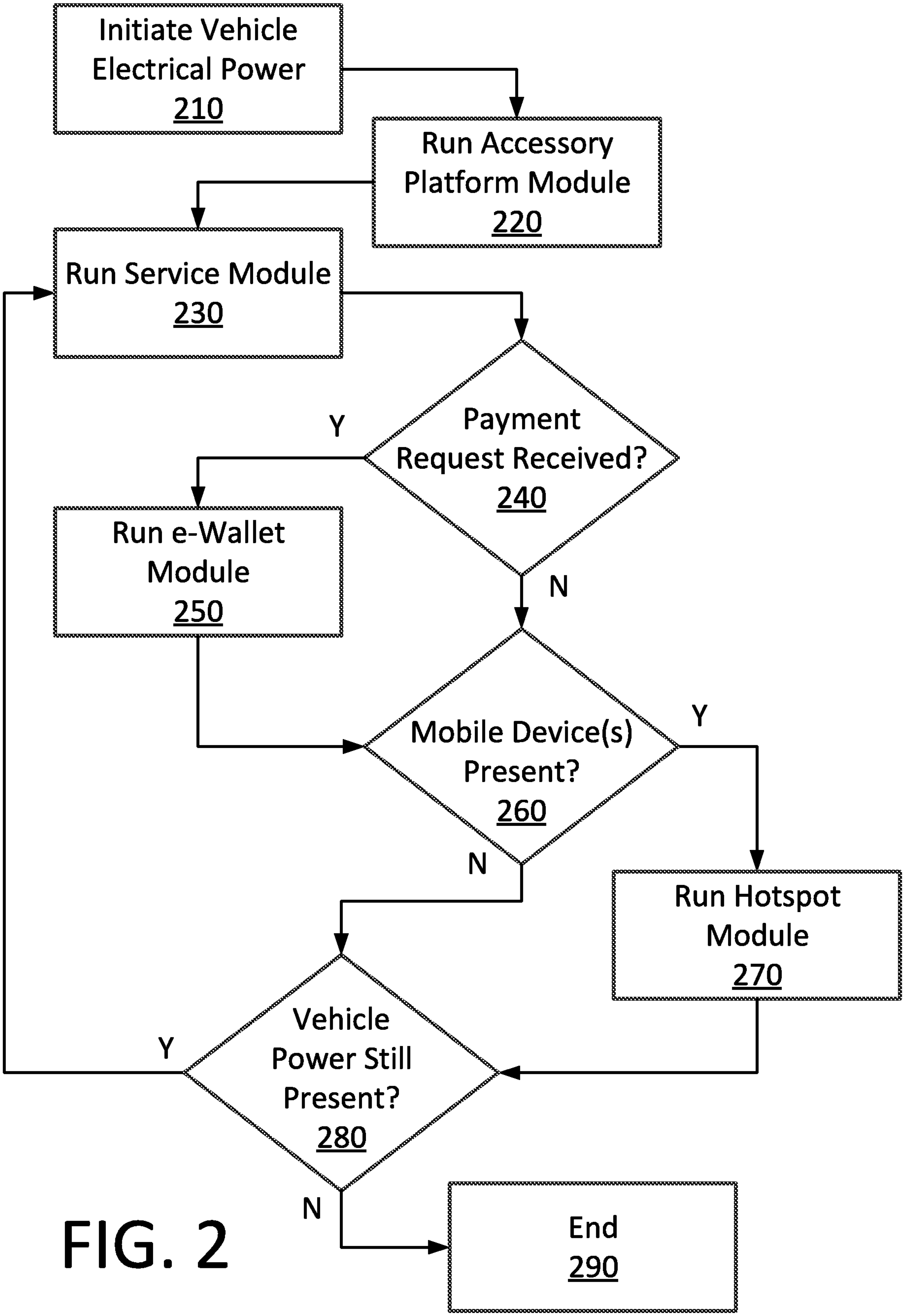
FIG. 2 illustrates a first set of steps that may be performed by a processor when that processor monitors the operation of a vehicle.

FIG. 2 illustrates a first set of steps that may be performed by a processor when that processor monitors the operation of a vehicle. The steps of FIG. 2 may be performed when instructions of a "base module" of Memory 150 of the present disclosure are executed by the processor. The steps of FIG. 2 may be implemented when processor 145 of FIG. 1 executes instructions out of Memory 150 of VLA system 140 of FIG. 1. The process begins when electrical power is initiated in the vehicle at step 210. The initiation of the electrical power may occur upon powering up the engine or may occur when an accessory mode of the vehicle is initiated. Operation of instructions of the base module may then initiate operation of the accessory platform software module, which may connect any accessories the user has installed in the vehicle. This may result in certain data feeds being identified for monitoring. Data gathered by accessories may be provided to the VLA system 140 of FIG. 1 as a continuous set of data or data feed. Collected data may then be compared to operating parameters of a vehicle (e.g. tire pressure, maximum oil pressure/level, or maximum engine temperature) that may have been retrieved from a database of a manufacturer of the vehicle. This process may include each of a number of accessories providing data via the engine bus 120 of FIG. 1, at step 220. Instructions of the VLA service software module may then be initiated in step 230. The execution of the instructions of the VLA service software module may allow processor 145 of the VLA system 140 of FIG. 1 to continuously monitor the operating condition of the vehicle so as to identify any data point that is outside a set of preferred conditions, determine whether a vehicle requires service, identify a qualified service facility, and automatically book the appointment with the service facility, at step 230 of FIG. 2. The base module may then poll for payment requests, at determination step 240. If a payment request has been received, instructions of the VLA e-Wallet Module may be initiated at step 250. Instructions of step 250 may allow a processor to provide a payment or to authorize that a payment be made. These instructions may only allow authorized service facilities to receive payments based on that facility being an authorized payee.

Either after step 250 or when determination step 240 identifies that a payment request has not been received, program flow may move to determination step 260 that may identify whether any mobile devices are present. When a mobile device is present, the hotspot software module may be initiated at step 270. The hotspot module may then review and filter program applications available from a network applications database based upon current operating characteristics of the vehicle. For example, an application that identifies local attractions may be accessed when a vehicle is stationary, action games for when the vehicle is on a winding road may be identified, or entertainment applications may be identified when the vehicle is cruising on a highway. Next, determination step 280 may identify whether power is still active at the vehicle. If power is still present, the operation of the base module returns to step 230. When determination step 280 identifies that the power is no longer active, operation of the base module may end at step 290 of FIG. 1.

Figure 3:
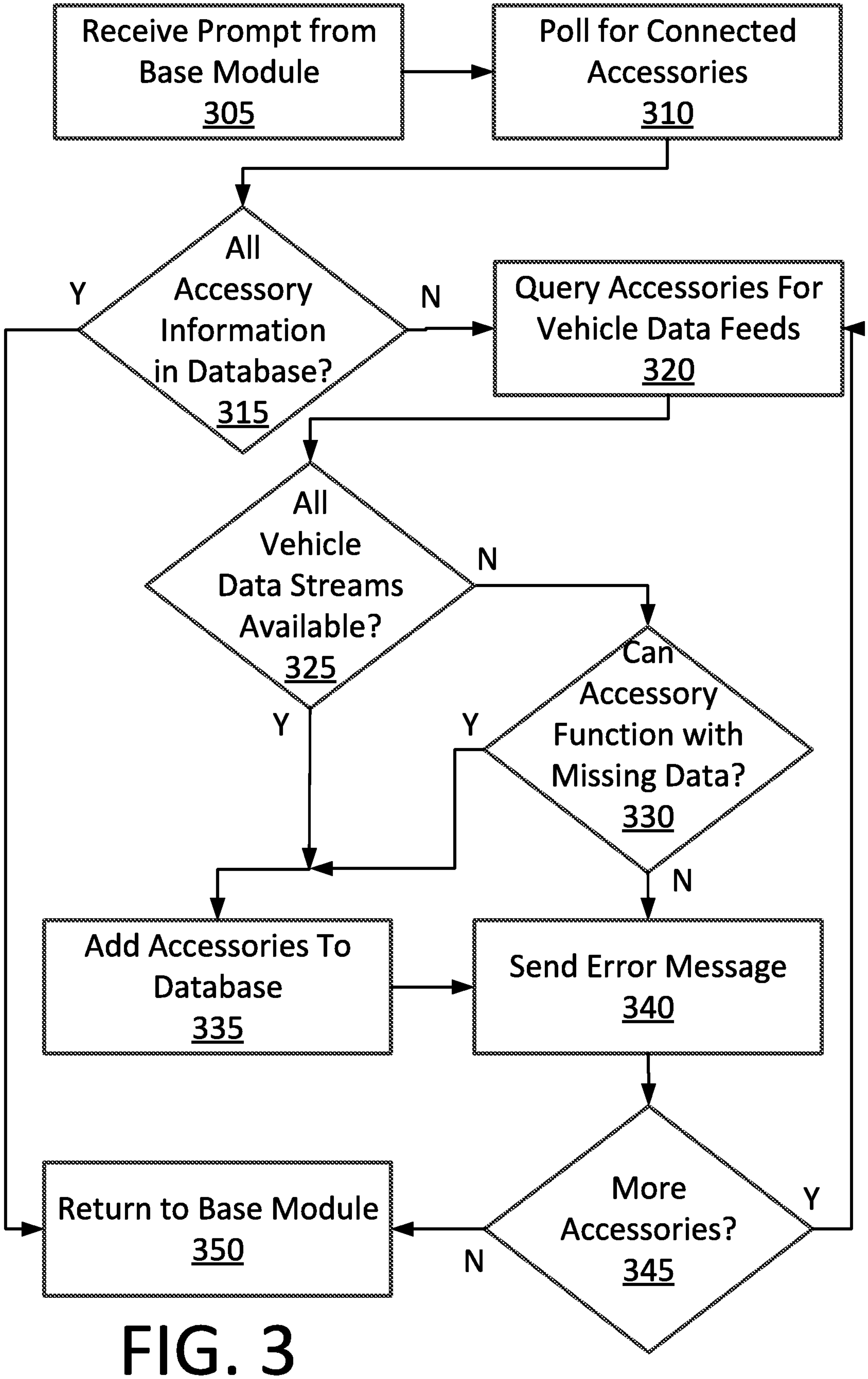
FIG. 3 illustrates a set of steps that may be performed by a processor when that processor identifies and organizes the operation of accessories that collect data at a vehicle.

FIG. 3 illustrates a set of steps that may be performed by a processor when that processor identifies and organizes the operation of accessories that collect data at a vehicle. The steps of FIG. 3 may be performed when instructions of a an "accessory platform module" of Memory 150 of the present disclosure are executed by a processor. The steps of FIG. 3 may be implemented when processor 145 of FIG. 1 executes instructions out of memory 150 of VLA system 140 of FIG. 1. FIG. 3 begins with step 305 where a prompt is received from the base module. Next in step 310 various accessories may be polled to identify accessories that are connected to a VLA system. As previously discussed, VLA system 140 accessories may include a heads up display or sensors. Operation of the instructions of the accessory platform software module may then cause the processor to identify in step 315 whether information related to all accessories identified in step 310 are stored in an accessories database of Databases 155. When information related to an accessory is not stored in the accessories database, program flow may move to step 320 where the accessories may be queried for the information that may be required for operation. As such, accessories that are configured to provide information relating to their operation may provide relevant information in step 320 of FIG. 3. Additionally or alternatively instructions of an accessory platform software module may cause a processor to retrieve any relevant data from a website of a manufacturer of the accessory in step 320. When all relevant or required information is stored in the accessories database, program flow may move to step 350 where instructions of the base module are executed.

Determination step 325 may then identify whether data from a set of data streams are available, when no program flow may move to determination step 330. Determination step 330 may identify whether an accessory can function without the data stream data. When determination step identifies that all of the required data feeds are available, program flow may move to step 335. Data relating to the accessories may be added to the accessory database may be identified in step 335 of FIG. 3.

When determination step 330 identifies that an accessory cannot function with missing data, program flow may move to step 340 where an error message may be generated. Program flow may also move to step 340 after step 335 in instances when any anomalies relating to data stored in the database are identified and an error message may be sent. Error messages may be sent to either a user mobile device, a vehicle display, or a third device used to bridge the engine and the devices. Determination step 345 may then identify whether more accessories need to be added to the accessories database, program flow may move back to step 320 where these other accessories may be queried. When determination step 345 identifies that no additional accessories are connected that have not already been queried, program flow may return to the base module, at step 350 of FIG. 3.

Figure 4:
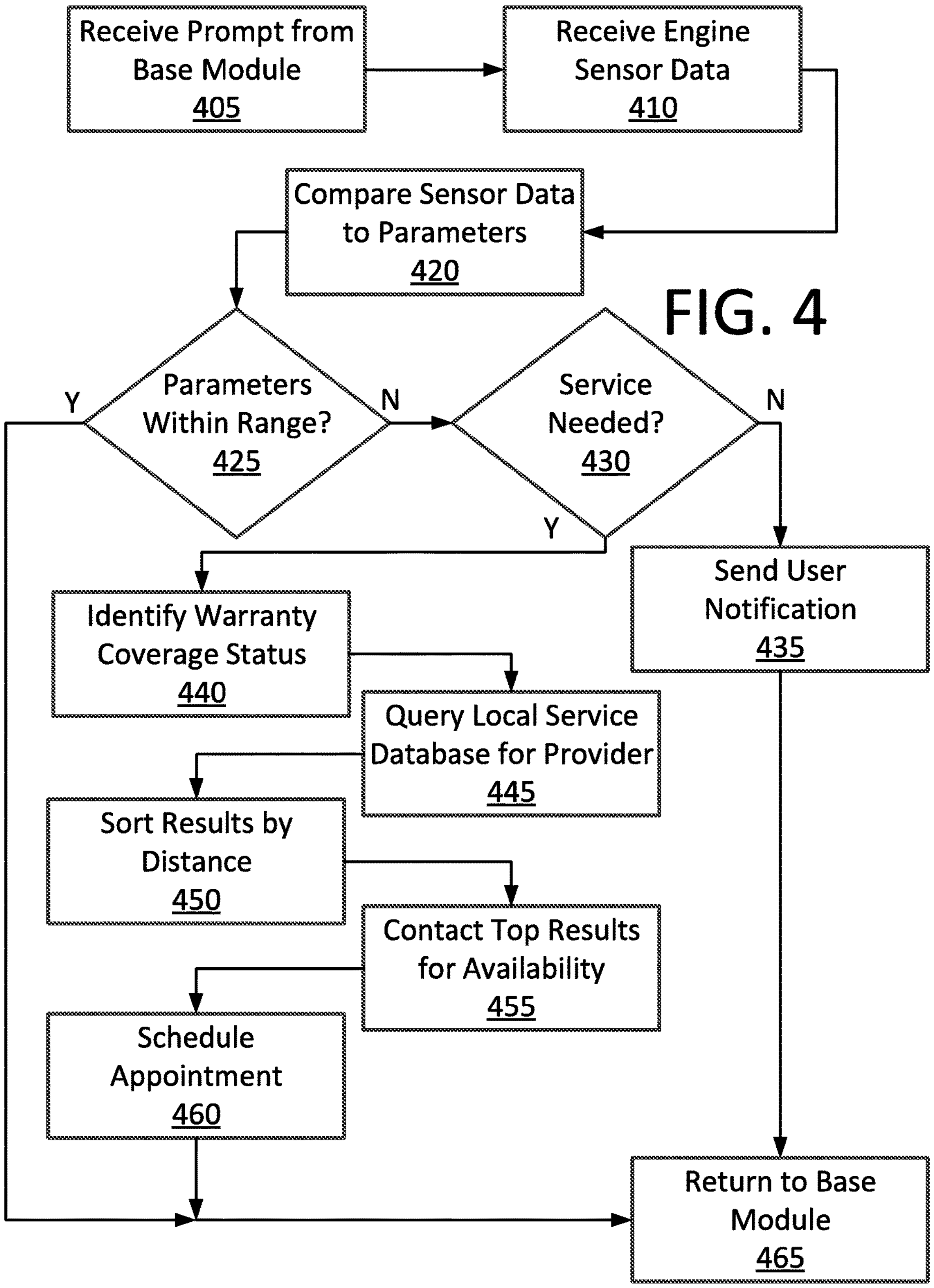
FIG. 4 illustrates steps that may be performed by a processor when a processor identifies a fault condition of a vehicle and when that processor identifies service centers capable of resolving that vehicle fault condition.

FIG. 4 illustrates steps that may be performed by a processor when a processor identifies a fault condition of a vehicle and when that processor identifies service centers capable of resolving that vehicle fault condition. The steps of FIG. 4 may be performed when instructions of a "servicing module" of Memory 150 of the present disclosure are executed by the processor. The steps of FIG. 2 may be implemented when processor 145 of FIG. 1 executes instructions out of memory 150 of VLA system 140 of FIG. 1. The process begins with receiving a prompt from the VLA base module, at step 405 of FIG. 4. Next, in step 410 sensor readings may be received from the engine bus. The received sensor data may be compared with acceptable ranges of the operating parameters. This may be accomplished by accessing an operating parameter database of Databases 155 that stores optimal or acceptable operating conditions. The operating parameter database may also store information relating to services that may be performed when the sensor data are outside of the optimal or acceptable range of operating conditions. These optimal or acceptable range data may have been supplied by or retrieved from a vehicle manufacturer. Next, determination step 425 may identify whether current data is inside of the a range of normal operating parameters, when no, program flow may move to determination step 430. When determination step 425 identifies that the parameters are within a normal operation range, program flow may move to step 465 where operation returns to the base software module of Memory 150.

When program flow moves to determination step 430, a condition indicated by the reading outside of operating parameters may be evaluated to see if the vehicle should be serviced. Determination step 430 may identify that servicing is not required when a tire pressure reading is low. In such an instance, a notification may be sent to the driver of the vehicle that identifies the operating condition, at step 435. That notification may then be displayed on connected mobile devices, provided via an audio message to the driver, and/or be displayed on a vehicle display. After step 435, program flow may move to step 465 where program operation returns to performing functions of the base software module of Memory 150.

When determination step 430 identifies that a service is recommended or required, program flow may move from determination step 430 to step 440 that may identify whether the service is covered by a warranty. After step 440, a local service provider database may be queried to identify a provider in step 445. This service provider database may be the local servicing database of databases 155 of FIG. 1. Step 445 may include identifying service facilities that are capable of performing the service required. A set of providers identified in step 445 may be sorted by distance when a closest service provider is identified and that closest vendor may be selected. Alternatively or additionally, step 450 may sort identified providers based on other factors, such as availability, price, being an authorized warranty repair shop, etc. Also in other embodiments, results can be sorted by bidding results showing changed pricing allowing a driver to choose a lower bid.

The system may automatically contact a top provider of the identified providers or may identify several providers in order to make an appointment for the necessary service at step 455 of FIG. 4. An appointment may then be automatically scheduled in step 460 of FIG. 4. In certain instances, the appointment scheduled may be a first available appointment time. Next program flow may return to functions associated with the base module of Memory 150 in step 465 of FIG. 4.

In instances when a vehicle is traveling on a long distance trip, information stored in a local servicing database may be updated as the vehicle moves from one locality to another. This may be accomplished by the processor 145 retrieving data from the network servicing database at the vehicle applications network 160 of FIG. 1 as the vehicle moves through different localities.

Figure 5:
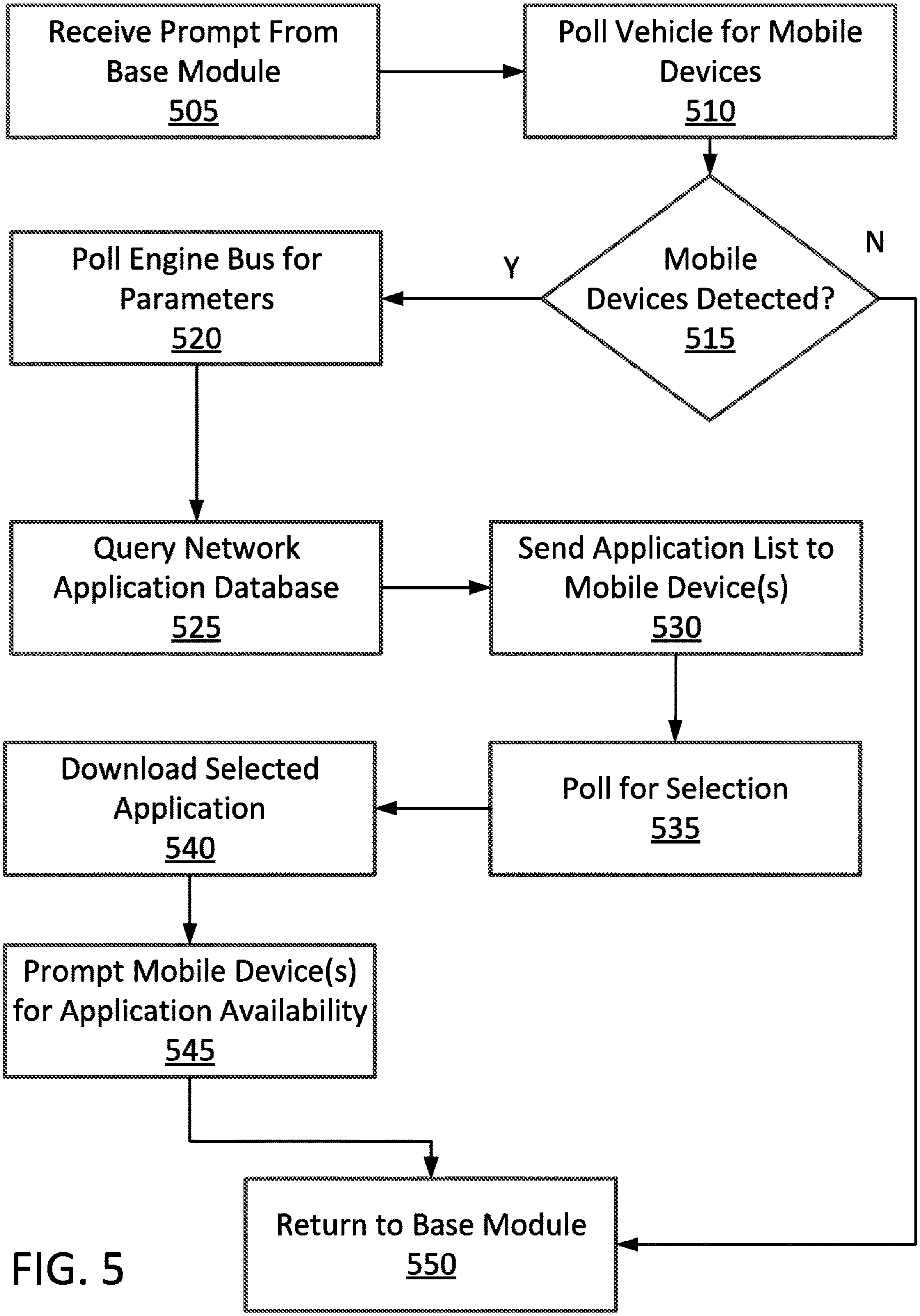
FIG. 5 illustrates steps that that may be performed when a program application is identified and prepared for execution at a computing device.

FIG. 5 illustrates steps that may be performed when a program application is identified and prepared for execution at a computing device. The steps of FIG. 5 may be performed when instructions of a "hotspot module" of Memory 150 of the present disclosure are executed by a processor. The steps of FIG. 5 may be implemented when processor 145 of FIG. 1 executes instructions out of memory 150 of VLA system 140 of FIG. 1. FIG. 5 begins with receiving a prompt from the base module indicating mobile devices are located in the vehicle at step 505. Instructions of the hotspot module may cause a processor to poll the vehicle for mobile devices at step 510 and determination step 515 may identify whether any mobile devices have been detected. For a mobile device to be detected, a program application may have to be operational at that mobile device. When determination step 515 identifies that no mobile devices are detected, program flow may move back to performing functions associated with the base module of Memory 150 at step 550 of FIG. 5

When determination step 515 identifies a mobile device, the engine bus is polled by the hotspot module at step 520 for the current operating characteristics of the vehicle. The hotspot module may then identify current operating conditions, such as identifying that the vehicle is parked with the engine off, that the vehicle is driving on a winding road at 40 mph, or that the vehicle is cruising on a highway at 70 mph, etc. Next in step 525, a network application database may be accessed or queried for applications that match the operating parameters. Here again this may identify applications related to identifying local attractions finder for a stationary vehicle, identifying a flying game for driving on a winding road, or identify a movie channel that may provide video data for passengers to watch when the vehicle is cruising on the highway. Next in step 530, a list of the applications available with those optimized for the current vehicle characteristics at the top of the list may be sent to the identified user mobile device(s).

After step 535, the user mobile device(s) may be polled for an application selection after which information related to a selected application may be downloaded in step 540. Next, in step 545 the mobile device(s) may be sent a prompt that identifies the availability of the application for execution on their devices and deliver it when requested. Operation of instructions of the hotspot module may allow information or entertainment to send sent or streamed to mobile devices in the vehicle. This data may be sent to the VLA system 140 of FIG. 1 and it may be forwarded to individual mobile devices via a low power communication interface, such as Bluetooth. After step 545, program flow return to the base module of Memory 150 at step 550 of FIG. 5

Figure 6:
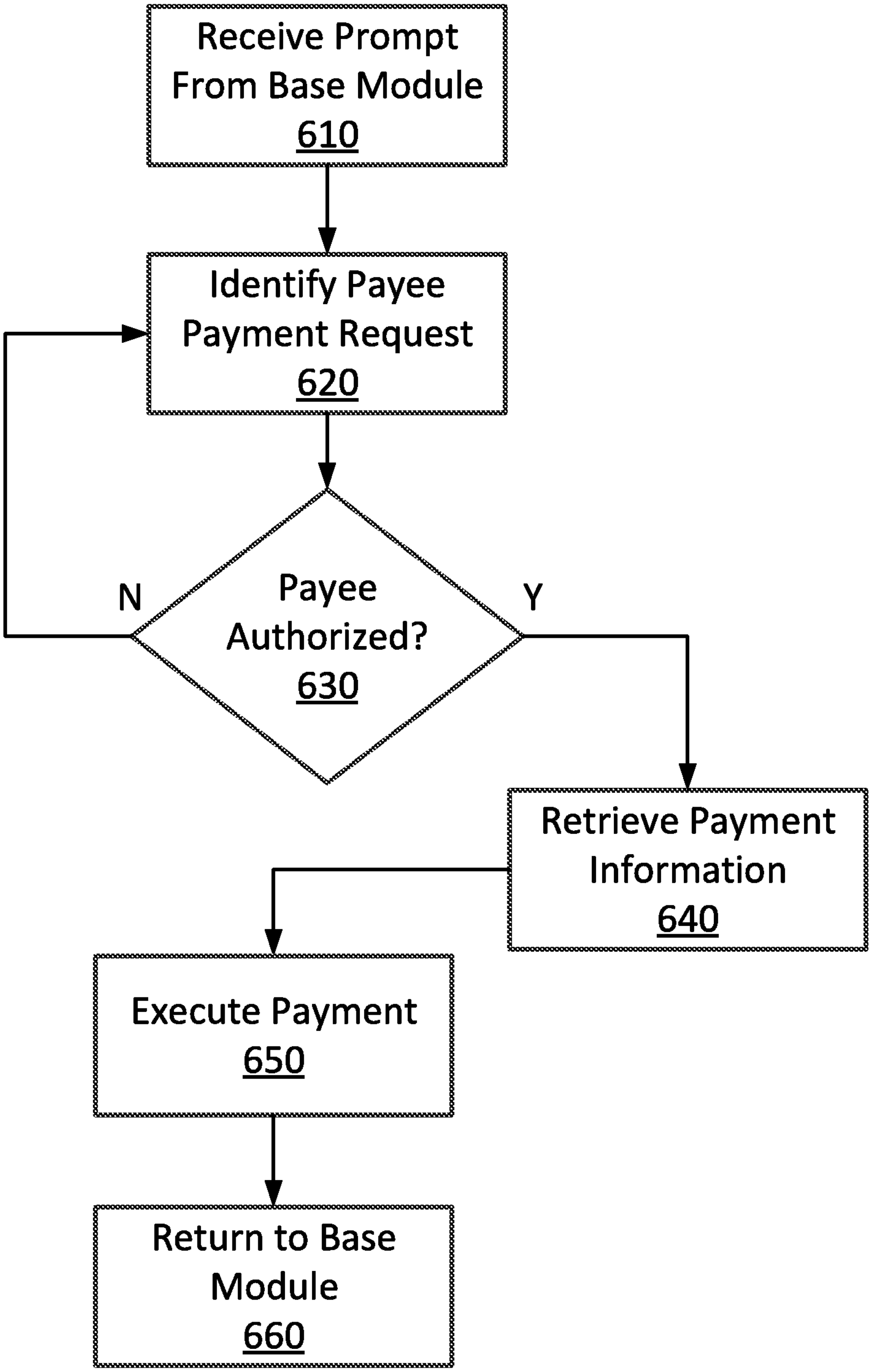
FIG. 6 illustrates steps that may be performed when a service center is identified as an authorized service center and when payments for services rendered are made to an account of the service center.

FIG. 6 illustrates steps that may be performed when a service center is identified as an authorized service center and when payments for services rendered are made to an account of the service center. The steps of FIG. 6 may be performed when instructions of an "e-wallet module" at Memory 150 of the present disclosure are executed by a processor. The steps of FIG. 2 may be implemented when processor 145 of FIG. 1 executes instructions out of memory 150 of VLA system 140 of FIG. 1. FIG. 6 begins with receiving a prompt from the VLA Base Module a payment request has been made of the vehicle, at step 610. The execution of instructions of the e-Wallet Module may identify in step 620 a payee (an entity requesting payment) payment request. Next, determination step 630 may identify whether the payee is an authorized payee, when no program flow may move back to step 620, where another payee may be identified. An authorized payee may be identified by accessing an e-wallet database. When determination step 630 identifies that the payee is an authorized payee, program flow may move to step 640 where payment information is retrieved. Next in step 650 the payment may be paid (executed) or authorized. After step 650 program flow may move back to the base software module in step 660 of FIG. 6. Payments may be processed and executed via one of many possible different mobile payment methods. Using systems such as near field data communications (NFC) based mobile wallet systems. After step 650 program flow may move back to the base software module in step 660 of FIG. 6.

Table 1 includes information that may be stored in a local servicing database, such as the local servicing database of the databases 155 of FIG. 1. Information stored in table 1 may identify automotive repair and service facilities in the area near a vehicle. Each facility may be associated with their address or geolocation, their service menu & rates, an indication of if they are authorized to perform warranty or other work, and a link to their scheduling site. This data may be utilized when the steps of FIG. 4 are performed. The data of table 1 maybe accessed to identify which facilities where a necessary service detected by the operations of FIG. 4 can be performed. For example, when a problem covered by the warranty can only be serviced by the authorized dealership, may result in a nearby authorized dealership being identified. Alternatively, when the system detects worn brake pads that are not associated with a warranty, other criteria may be used to select a service provider. In such instances, the data of table 1 may be accessed to identify another service facility because it is cheaper, is closer to the vehicle, or that has better appointment availability.

Table 1 identifies several local service entities that can perform services. Table 1 includes a first service provider ABC Ford dealership that can provide warranty repair work. Table 1 also identifies non-warranty service shops of XYZ Transmission, Main Street Auto Body, and Downtown Brake. Each of these service providers are associated with a street address.

TABLE 1

Servicing Database Data

| Service Station | Address | Service & Rates | Warranty | Contract & Availability |
|---|---|---|---|---|
| ABC Ford | 12 Center Rd. Burlington, VT | Service menu.dat | Y | www.abcford.com/service/appt |
| XYZ Transmission | 25 River Rd. Burlington, VT | Service menu.dat | N | www.xyztransmission.com/service/appt |
| Main St. Auto Body | 123 Main St. Burlington, VT | Service menu.dat | N | www.mainstautobody.com/service/appt |
| Downtown Brake | 5 Battery St. Burlington, VT | Service menu.dat | N | www.downtownbrake.com/service/appt |

Table 2 illustrates data that may be stored in an e-Wallet Database. Note that table 2 stores payment method information (e.g. credit card numbers) that the a user has loaded into the system along with any authorized payees. For example, the user has loaded one credit card that may be used to make payments to the ABC Ford. Services provided by ABC Ford may be paid automatically based on the information stored in table 2. As such, credit card ending in digits 1234 may be billed for any work performed on the user's vehicle automatically. While credit card information is included in table 2, payments may be made by other means, by the use of NFC payments or electronic bank transfers, etc. Note that each of the different authorized payees of table 2 may be linked to different payment methods (e.g. credit cards, debit cards, or bank accounts).

TABLE 2 e-Wallet Payment Authorization Data

| Payment Method | Authorized Payee 1 ABC Ford | Authorized Payee 2 XYZ Transmission | Authorized Payee 3 Main St. Auto Body | Authorized Payee 4 Downton Brake |
|---|---|---|---|---|
| Credit Card XXXX-XXXX-XXXX-1234 | X | X | | |
| Credit Card XXXX-XXXX-XXXX-5678 | | | X | X |

Table 3 includes information of an accessories database. The information of table 3 may identify accessories and may identify whether data collected by those accessories are required to operate a vehicle. The data of table 3 may be the data stored in the accessory database of the databases 155 of FIG. 1. Processor 145 of FIG. 1 may access this data using functionally of the accessory platform module stored in memory 150 according to the steps of FIG. 3. The accessories database stores data about any accessories connected to a vehicle, which data feeds they need to operate optimally, and which data feeds they need to operate at a minimum capability. Each accessory may be associated with a set of conditions. These conditions may identify that data received from particular accessories are required and may identify that data received from other sensors are not necessary (are optional) for the vehicle to operate. Additional data feeds that cannot be utilized by the accessory are listed as not applicable in table 3. The information that populates this table can come either from the accessory device itself when it connects and communicates to a system, or this information may be downloaded from a manufacturer's website.

Note that table 3 identifies that data sensed by a tachometer and data sensed by a wheel speed sensor must be sent to a heads up display at a vehicle because they are identified as being "required." Table 3 also identifies that data relating to tire pressure, a gyroscope, a coolant temperature, an oil temperature, a boost pressure, an MAF sensor, or an exhaust sensor may optionally be provided to the heads up display. The data of table 3 also identifies that the only required data that must be provided to the race camera is from the wheel speed sensor. Data feeds associated with the efficiency helper identify data from the tachometer, the wheel speed sensor, the MAF sensor, and the Exhaust sensor must be provided to the efficiency helper. Table 3 also identifies that data collected by the gyroscope, the coolant temperature sensor, the oil temperature sensor, and the boost pressure sensor are not applicable to the efficiency helper. The efficiency helper may be associated with an external computer or a program application that monitors how efficiently a vehicle is being driven and this computer or application may provide a driver with efficiency information via a user interface at a vehicle computer.

TABLE 3

| Vehicle Accessories Database | | | |
|---|---|---|---|
| Accessory | Heads Up Display | Race Camera | Efficiency Helper |
| Tachometer | Required | Optional | Required |
| Wheel Speed | Required | Required | Required |
| Tire Pressure | Optional | Optional | Optional |
| Gyroscope | Optional | Optional | Not Applicable |
| Coolant Temperature | Optional | Optional | Not Applicable |
| Oil Temperature | Optional | Optional | Not Applicable |
| Boost Pressure | Optional | Optional | Not Applicable |
| MAF Sensor | Optional | Optional | Required |
| Exhaust | Optional | Optional | Required |

Figure 7:
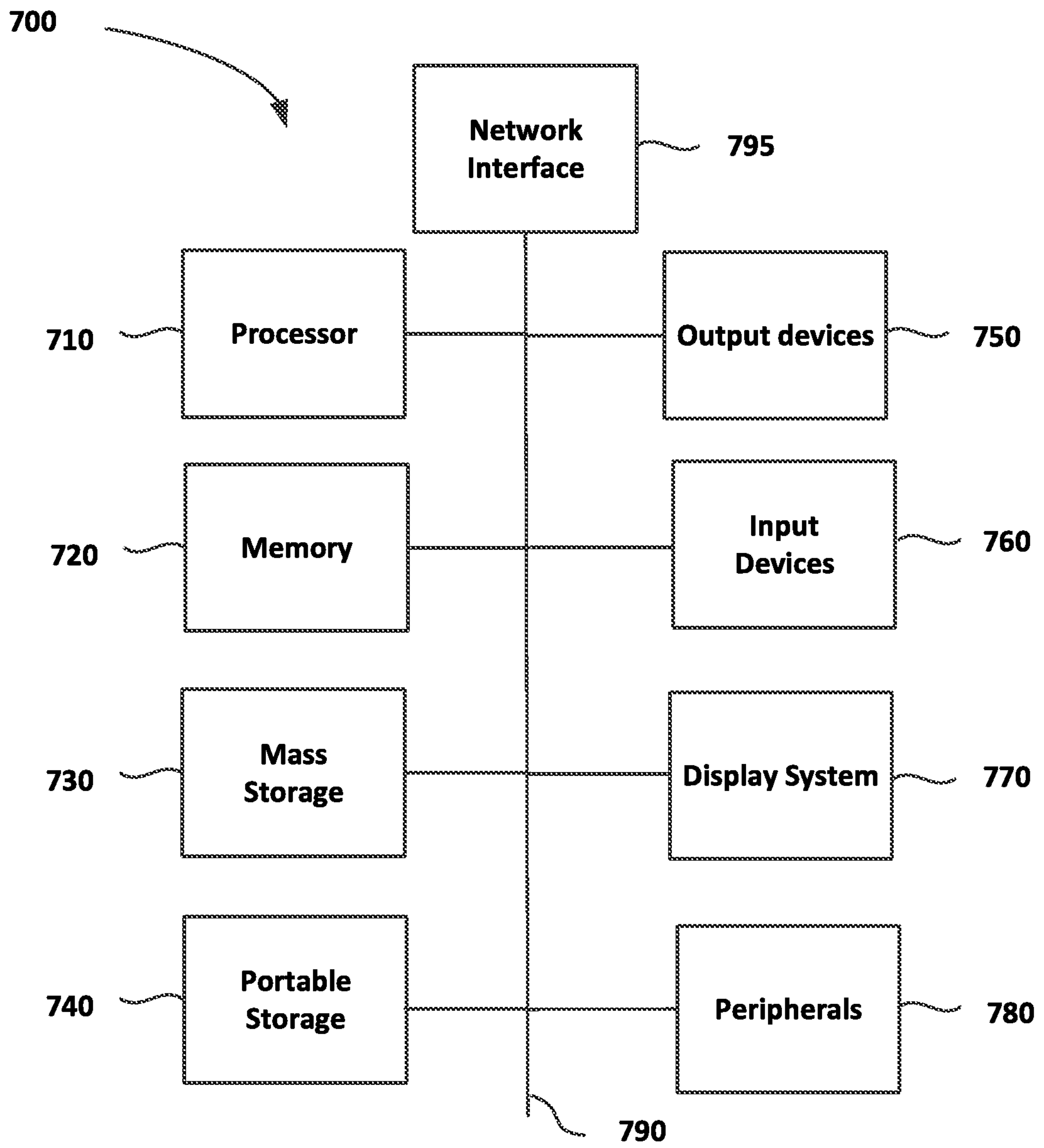
FIG. 7 illustrates a computing system that may be used to implement an embodiment of the present invention.

FIG. 7 illustrates a computing system that may be used to implement an embodiment of the present invention. The computing system 700 of FIG. 7 includes one or more processors 710 and main memory 720. Main memory 720 stores, in part, instructions and data for execution by processor 710. Main memory 720 can store the executable code when in operation. The system 700 of FIG. 7 further includes a mass storage device 730, portable storage medium drive(s) 740, output devices 750, user input devices 760, a graphics display 770, peripheral devices 780, and network interface 795.

The components shown in FIG. 7 are depicted as being connected via a single bus 790. However, the components may be connected through one or more data transport means. For example, processor unit 710 and main memory 720 may be connected via a local microprocessor bus, and the mass storage device 730, peripheral device(s) 780, portable storage device 740, and display system 770 may be connected via one or more input/output (I/O) buses.

Mass storage device 730, which may be implemented with a magnetic disk drive or an optical disk drive, is a non-volatile storage device for storing data and instructions for use by processor unit 710. Mass storage device 730 can store the system software for implementing embodiments of the present invention for purposes of loading that software into main memory 720.

Portable storage device 740 operates in conjunction with a portable non-volatile storage medium, such as a FLASH memory, compact disk or Digital video disc, to input and output data and code to and from the computer system 700 of FIG. 7. The system software for implementing embodiments of the present invention may be stored on such a portable medium and input to the computer system 700 via the portable storage device 740.

Input devices 760 provide a portion of a user interface. Input devices 760 may include an alpha-numeric keypad, such as a keyboard, for inputting alpha-numeric and other information, or a pointing device, such as a mouse, a trackball, stylus, or cursor direction keys. Additionally, the system 700 as shown in FIG. 7 includes output devices 750. Examples of suitable output devices include speakers, printers, network interfaces, and monitors.

Display system 770 may include a liquid crystal display (LCD), a plasma display, an organic light-emitting diode (OLED) display, an electronic ink display, a projector-based display, a holographic display, or another suitable display device. Display system 770 receives textual and graphical information, and processes the information for output to the display device. The display system 770 may include multiple-touch touchscreen input capabilities, such as capacitive touch detection, resistive touch detection, surface acoustic wave touch detection, or infrared touch detection. Such touchscreen input capabilities may or may not allow for variable pressure or force detection.

Peripherals 780 may include any type of computer support device to add additional functionality to the computer system. For example, peripheral device(s) 780 may include a modem or a router.

Network interface 795 may include any form of computer interface of a computer, whether that be a wired network or a wireless interface. As such, network interface 795 may be an Ethernet network interface, a BlueTooth™ wireless interface, an 802.11 interface, or a cellular phone interface.

The components contained in the computer system 700 of FIG. 7 are those typically found in computer systems that may be suitable for use with embodiments of the present invention and are intended to represent a broad category of such computer components that are well known in the art. Thus, the computer system 700 of FIG. 7 can be a personal computer, a hand held computing device, a telephone ("smart" or otherwise), a mobile computing device, a workstation, a server (on a server rack or otherwise), a minicomputer, a mainframe computer, a tablet computing device, a wearable device (such as a watch, a ring, a pair of glasses, or another type of jewelry/clothing/accessory), a video game console (portable or otherwise), an e-book reader, a media player device (portable or otherwise), a vehicle-based computer, some combination thereof, or any other computing device. The computer can also include different bus configurations, networked platforms, multi-processor platforms, etc. The computer system 700 may in some cases be a virtual computer system executed by another computer system. Various operating systems can be used including Unix, Linux, Windows, Macintosh OS, Palm OS, Android, iOS, and other suitable operating systems.

The present invention may be implemented in an application that may be operable using a variety of devices. Non-transitory computer-readable storage media refer to any medium or media that participate in providing instructions to a central processing unit (CPU) for execution. Such media can take many forms, including, but not limited to, non-volatile and volatile media such as optical or magnetic disks and dynamic memory, respectively. Common forms of non-transitory computer-readable media include, for example, a floppy disk, a flexible disk, a hard disk, magnetic tape, any other magnetic medium, a CD-ROM disk, digital video disk (DVD), any other optical medium, RAM, PROM, EPROM, a FLASH EPROM, and any other memory chip or cartridge.

While various flow diagrams provided and described above may show a particular order of operations performed by certain embodiments of the invention, it should be understood that such order is exemplary (e.g., alternative embodiments can perform the operations in a different order, combine certain operations, overlap certain operations, etc.).

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen in order to best explain the principles of the technology and its practical application to thereby enable others skilled in the art to best utilize the technology in various embodiments and with various modifications as are suited to the particular use contemplated. It is intended that the scope of the technology be defined by the claim.

What is claimed is:

1. A method for sensor-based vehicle fault identification, the method comprising:

capturing first sensor data using a first sensor that is part of a vehicle while the vehicle is driving, the first sensor data conveyed to a computing device through an onboard diagnostic bus of the vehicle that is coupled to the first sensor, wherein the first sensor data measures a first parameter indicative of operation of the vehicle and is encoded according to a standardized protocol associated with the onboard diagnostic bus, capturing second sensor data using a second sensor that is part of an accessory to the vehicle while the vehicle is driving, wherein the second sensor is coupled to an accessory platform distinct from the onboard diagnostic bus, and wherein the second sensor data measures a second parameter indicative of the operation of the vehicle and is encoded differently than the first sensor data;

interpreting the second sensor data using the accessory platform based on accessory information to generate interpreted second sensor data, wherein the accessory information is specific to the accessory;

processing, by the computing device, the first sensor data and the interpreted second sensor data to generate a numeric value for a third parameter, wherein the third parameter is indicative of operation of a component of the vehicle while the vehicle is driving at a first time;

identifying, by the computing device and based on a first database associated with the vehicle, an operational range for the third parameter, wherein the operational range includes a range of numeric values between a lower numeric threshold and an upper numeric threshold;

evaluating, by the computing device, the numeric value relative to the operational range to identify a fault condition that is associated with the component of the vehicle and that affects driving of the vehicle;

identifying, by the computing device and based on the fault condition, a corrective action to modify the operation of the component of the vehicle to shift the third parameter into the operational range and resolve the fault condition;

identifying, by the computing device and based on signals received using a vehicle location system at the vehicle, a location of the vehicle;

filtering, by the computing device, a second database associated with vehicle servicing based on the location and the fault condition to identify a subset of a plurality of service providers that are referenced in the second database, wherein the subset are capable of performing the corrective action to resolve the fault condition associated with the component of the vehicle and are within a predetermined distance of the location;

sorting, by the computing device, the subset into an order that is based on distance from the location of the vehicle and scheduling availability;

automatically selecting, by the computing device, a service provider from the subset based on the order;

automatically scheduling, by the computing device, an appointment with the service provider to perform the corrective action through an interaction between the computing device and a website associated with the service provider; and verifying, by the computing device and based on additional sensor data captured using the first sensor and the second sensor, that that the fault condition is resolved as of a second time that is after the first time and after the appointment and while the vehicle is driving.

2. The method of claim 1, further comprising:

identifying that the operational range is not stored in a memory associated with the computing device, wherein identifying the operational range includes retrieving the operational range from a second computing device that is associated with the first database.

3. The method of claim 1, further comprising:

identifying a second operational range for one of the first parameter or the second parameter, and wherein identifying the fault condition is based on evaluating the one of the first parameter or the second parameter in comparison with the second operational range.

4. The method of claim 1, further comprising:

requesting the operational range from the accessory through the accessory platform, wherein identifying the operational range includes receiving the operational range from the accessory through the accessory platform, and wherein the accessory is associated with the first database.

5. The method of claim 1, further comprising:

identifying a server that has access to the operational range, wherein identifying the operational range includes receiving the operational range from the server, and wherein the server is associated with the first database.

6. The method of claim 1, wherein scheduling the appointment includes sending a first communication to a second computing system associated with the website, and receiving a second communication from the second computing system.

7. The method of claim 1, further comprising:

identifying, based on the second database, that the service provider is an authorized vendor, wherein selecting the service provider is based on the service provider being the authorized vendor.

8. The method of claim 1, further comprising:

providing a payment authorization to a second computing device associated with the service provider, wherein the payment authorization is associated with the appointment.

9. The method of claim 1, further comprising:

sending warranty information to a second computing device associated with the service provider, wherein the service provider is to be compensated for the appointment based on the warranty information.

10. The method of claim 1, wherein capturing the first sensor data using the first sensor includes receiving the first sensor data by the computing device and through the onboard diagnostic bus; and wherein capturing the second sensor data using the second sensor includes receiving the second sensor data from a network server associated with the accessory platform.

11. A non-transitory computer-readable storage medium having embodied thereon a program executable by a processor for implementing a method for sensor-based vehicle fault identification, the method comprising:

capturing first sensor data using a first sensor that is part of a vehicle while the vehicle is driving, the first sensor data conveyed to a computing device through an onboard diagnostic bus of the vehicle that is coupled to the first sensor, wherein the first sensor data measures a first parameter indicative of operation of the vehicle and is encoded according to a standardized protocol associated with the onboard diagnostic bus;

capturing second sensor data using a second sensor that is part of an accessory to the vehicle while the vehicle is driving, wherein the second sensor is coupled to an accessory platform distinct from the onboard diagnostic bus, and wherein the second sensor data measures a second parameter indicative of the operation of the vehicle and is encoded differently than the first sensor data;

interpreting the second sensor data using the accessory platform based on accessory information to generate interpreted second sensor data, wherein the accessory information is specific to the accessory;

processing the first sensor data and the interpreted second sensor data to generate a numeric value for a third parameter, wherein the third parameter is indicative of operation of a component of the vehicle while the vehicle is driving at a first time;

identifying, based on a first database associated with the vehicle, an operational range for the third parameter, wherein the operational range includes a range of numeric values between a lower numeric threshold and an upper numeric threshold;

evaluating the numeric value relative to the operational range to identify a fault condition that is associated with the component of the vehicle and that affects driving of the vehicle;

identifying, based on the fault condition, a corrective action to modify the operation of the component of the vehicle to shift the third parameter into the operational range and resolve the fault condition;

identifying, based on signals received using a vehicle location system, a location of the vehicle;

filtering a second database associated with vehicle servicing based on the location and the fault condition to identify a subset of a plurality of service providers that are referenced in the second database, wherein the subset are capable of performing the corrective action to resolve the fault condition associated with the component of the vehicle and are within a predetermined distance of the location;

sorting the subset into an order that is based on distance from the location of the vehicle and scheduling availability;

automatically selecting a service provider from the subset based on the order;

automatically scheduling an appointment with the service provider to perform the corrective action through an interaction with a website associated with the service provider; and verifying, based on additional sensor data captured using the first sensor and the second sensor that the fault condition is resolved as of a second time that is after the first time and after the appointment and while the vehicle is driving.

12. The non-transitory computer-readable storage medium of claim 11, the method further comprising:

identifying that the operational range is not stored in the non-transitory computer-readable storage medium, wherein identifying the operational range includes retrieving the operational range from a computing device that is associated with the first database.

13. The non-transitory computer-readable storage medium of claim 11, the method further comprising:

identifying a second operational range for one of the first parameter or the second parameter, and wherein identifying the fault condition is based on evaluating the one of the first parameter or the second parameter in comparison with the second operational range.

14. The non-transitory computer-readable storage medium of claim 11, the method further comprising:

requesting the operational range from the accessory through the accessory platform, wherein identifying the operational range includes receiving the operational range from the accessory through the accessory platform, and wherein the accessory is associated with the first database.

15. The non-transitory computer-readable storage medium of claim 11, the method further comprising:

identifying a server that has access to the operational range, wherein identifying the operational range includes receiving the operational range from the server, and wherein the server is associated with the first database.

16. The non-transitory computer-readable storage medium of claim 11, wherein scheduling the appointment includes sending a first communication to a computing system associated with the website, and receiving a second communication from the computing system.

17. The non-transitory computer-readable storage medium of claim 11, the method further comprising:

identifying, based on the second database, that the service provider is an authorized vendor, wherein selecting the service provider is based on the service provider being the authorized vendor.

18. The non-transitory computer-readable storage medium of claim 11, the method further comprising:

providing a payment authorization to a computing device associated with the service provider, wherein the payment authorization is associated with the appointment.

19. An apparatus for sensor-based vehicle fault identification, the apparatus comprising:

a memory storing instructions; and a processor, wherein execution of the instructions causes the processor to:

capture first sensor data using a first sensor that is part of a vehicle while the vehicle is driving, the first sensor data conveyed to a computing device through an onboard diagnostic bus of the vehicle that is coupled to the first sensor, wherein the first sensor data measures a first parameter indicative of operation of the vehicle and is encoded according to a standardized protocol associated with the onboard diagnostic bus;

capture second sensor data using a second sensor that is part of an accessory to the vehicle while the vehicle is driving, wherein the second sensor is coupled to an accessory platform distinct from the onboard diagnostic bus, and wherein the second sensor data measures a second parameter indicative of the operation of the vehicle and is encoded differently than the first sensor data;

interpret the second sensor data using the accessory platform based on accessory information to generate interpreted second sensor data, wherein the accessory information is specific to the accessory;

process the first sensor data and the interpreted second sensor data to generate a numeric value for a third parameter, wherein the third parameter is indicative of operation of a component of the vehicle while the vehicle is driving at a first time;

identify, based on a first database associated with the vehicle, an operational range for the third parameter, wherein the operational range includes a range of numeric values between a lower numeric threshold and an upper numeric threshold;

evaluate the numeric value relative to the operational range to identify a fault condition that is associated with the component of the vehicle and that affects driving of the vehicle;

identify, based on the fault condition, a corrective action to modify the operation of the component of the vehicle to shift the third parameter into the operational range and resolve the fault condition;

identify, based on signals received using a vehicle location system, a location of the vehicle;

filter a second database associated with vehicle servicing based on the location and the fault condition to identify a subset of a plurality of service providers that are referenced in the second database, wherein the subset are capable of performing the corrective action to resolve the fault condition associated with the component of the vehicle and are within a predetermined distance of the location;

sort the subset into an order that is based on distance from the location of the vehicle and scheduling availability;

automatically select a service provider from the subset based on the order;

automatically schedule an appointment with the service provider to perform the corrective action through an interaction with a website associated with the service provider; and verify, based on additional sensor data captured using the first sensor and the second sensor, that the fault condition is resolved as of a second time that is after the first time and after the appointment and while the vehicle is driving.

20. The apparatus of claim 19, wherein the execution of the instructions by the processor causes the processor to:

identify a second operational range for one of the first parameter or the second parameter, and wherein identifying the fault condition is based on evaluating the one of the first parameter or the second parameter in comparison with the second operational range.

* * * * *